United States Patent
Arakawa et al.

(10) Patent No.: US 12,528,131 B2
(45) Date of Patent: Jan. 20, 2026

(54) JOINED BODY AND ELECTROSTATIC CHUCK

(71) Applicant: NGK SPARK PLUG CO., LTD., Nagoya (JP)

(72) Inventors: Ryuichi Arakawa, Nagoya (JP); Tomoo Tanaka, Nagoya (JP); Osamu Yoshimoto, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 556 days.

(21) Appl. No.: 17/922,539

(22) PCT Filed: Jun. 11, 2021

(86) PCT No.: PCT/JP2021/022229
§ 371 (c)(1),
(2) Date: Oct. 31, 2022

(87) PCT Pub. No.: WO2021/261284
PCT Pub. Date: Dec. 30, 2021

(65) Prior Publication Data
US 2023/0226630 A1      Jul. 20, 2023

(30) Foreign Application Priority Data

Jun. 26, 2020  (JP) ................. 2020-110418

(51) Int. Cl.
*B32B 3/24*    (2006.01)
*B23K 1/19*    (2006.01)
(Continued)

(52) U.S. Cl.
CPC .............. *B23K 1/19* (2013.01); *B32B 3/26* (2013.01); *B32B 5/022* (2013.01); *B32B 5/145* (2013.01);
(Continued)

(58) Field of Classification Search
None
See application file for complete search history.

(56) References Cited

U.S. PATENT DOCUMENTS 2,530,552 A * 11/1950 Stoddard, Jr. ........ B23K 1/0008
                                                              228/19
2,694,852 A * 11/1954 Rogers ................. B23K 35/001
                                                              428/673
(Continued)

FOREIGN PATENT DOCUMENTS

CN          2320408 Y  *  5/1999
CN        101596595 A  * 12/2009
(Continued)

OTHER PUBLICATIONS

Machine Translation of JPH02175803A, Jul. 1990 (Year: 1990).*
(Continued)

*Primary Examiner* — Jeffrey A Vonch
(74) *Attorney, Agent, or Firm* — Stites & Harbison, PLLC; Jeffrey A. Haeberlin; James R. Hayne

(57) ABSTRACT

A joined body includes a first member, a second member, and a joining portion disposed therebetween and joining the first member and the second member. The joining portion includes a first joining layer on a side toward the first member and formed of a first joining material, a second joining layer on a side toward the second member and formed of a second joining material, and a metal layer therebetween and having a plurality of holes communicating with one another. The metal layer includes a first-joining-material-impregnated layer on a side toward the first joining layer and in which the plurality of holes are impregnated with the first joining material, a second-joining-material-impregnated layer on a side toward the second joining layer and in which the plurality of holes are impregnated with the
(Continued)

second joining material, and an unfilled hole layer therebetween and in which the plurality of holes are void.

8 Claims, 8 Drawing Sheets

(51) Int. Cl.
    *B32B 3/26*    (2006.01)
    *B32B 5/02*    (2006.01)
    *B32B 5/14*    (2006.01)
    *B32B 7/10*    (2006.01)
    *B32B 7/12*    (2006.01)
    *B32B 15/02*    (2006.01)
    *B32B 15/04*    (2006.01)
    *H01L 21/683*    (2006.01)
    *H01L 21/687*    (2006.01)
    *B23K 1/00*    (2006.01)
    *B23K 103/00*    (2006.01)
    *B23K 103/16*    (2006.01)
    *C04B 37/02*    (2006.01)

(52) U.S. Cl.
CPC ............... *B32B 7/10* (2013.01); *B32B 7/12* (2013.01); *B32B 15/02* (2013.01); *B32B 15/04* (2013.01); *H01L 21/683* (2013.01); *H01L 21/6833* (2013.01); *H01L 21/68785* (2013.01); *B23K 1/0008* (2013.01); *B23K 1/0016* (2013.01); *B23K 2103/166* (2018.08); *B23K 2103/52* (2018.08); *B32B 3/266* (2013.01); *B32B 2260/021* (2013.01); *B32B 2260/04* (2013.01); *B32B 2262/103* (2013.01); *B32B 2262/16* (2021.05); *B32B 2305/026* (2013.01); *B32B 2305/073* (2013.01); *C04B 37/02* (2013.01); *H01L 21/68757* (2013.01); *Y10T 428/12361* (2015.01); *Y10T 428/12424* (2015.01); *Y10T 428/12431* (2015.01); *Y10T 428/12444* (2015.01); *Y10T 428/12479* (2015.01); *Y10T 428/24331* (2015.01); *Y10T 428/24942* (2015.01); *Y10T 428/24992* (2015.01); *Y10T 428/249956* (2015.04); *Y10T 428/249957* (2015.04); *Y10T 442/2738* (2015.04); *Y10T 442/2926* (2015.04); *Y10T 442/50* (2015.04); *Y10T 442/655* (2015.04)

(56) References Cited

U.S. PATENT DOCUMENTS

| | | | | |
|---|---|---|---|---|
| 4,338,380 A * | 7/1982 | Erickson | C04B 37/026 | 428/209 |
| 4,529,836 A * | 7/1985 | Powers | H01L 23/3733 | 228/123.1 |
| 4,629,397 A * | 12/1986 | Schweitzer | F01D 5/284 | 416/241 B |
| 4,645,068 A * | 2/1987 | Partz | C04B 37/026 | 228/122.1 |
| 4,650,107 A * | 3/1987 | Keser | H01L 24/29 | 228/123.1 |
| 5,076,875 A * | 12/1991 | Padden | B32B 27/32 | 156/303.1 |
| 5,145,729 A * | 9/1992 | Padden | A61C 7/16 | 442/7 |
| 5,886,863 A * | 3/1999 | Nagasaki | H01L 21/6831 | 279/128 |
| 6,051,303 A * | 4/2000 | Katsuda | G03F 7/70691 | 269/53 |
| 6,280,584 B1 * | 8/2001 | Kumar | H02N 13/00 | 204/192.12 |
| 6,465,110 B1 * | 10/2002 | Boss | B32B 15/14 | 428/605 |
| 6,490,144 B1 * | 12/2002 | Narendrnath | H01L 21/67098 | 361/234 |
| 6,503,368 B1 * | 1/2003 | Kholodenko | C23C 16/4586 | 156/345.52 |
| 8,220,695 B1 * | 7/2012 | Wei | B23K 1/008 | 228/221 |
| 12,251,923 B2 * | 3/2025 | Yoshimoto | B23K 1/0008 | |
| 2002/0190388 A1 * | 12/2002 | Eytcheson | H01L 24/31 | 438/618 |
| 2004/0016792 A1 * | 1/2004 | Fujii | B32B 15/04 | 428/642 |
| 2005/0095446 A1 * | 5/2005 | Cless | B32B 15/14 | 29/521 |
| 2005/0101082 A1 * | 5/2005 | Yokoyama | C23C 16/4581 | 438/232 |
| 2005/0118450 A1 * | 6/2005 | Fujii | B23K 35/286 | 228/245 |
| 2006/0180640 A1 * | 8/2006 | Ariga | B23K 1/19 | 228/262.9 |
| 2007/0199660 A1 * | 8/2007 | Yokoyama | H01L 21/6833 | 438/689 |
| 2008/0138645 A1 * | 6/2008 | Kawajiri | H01L 21/68757 | 428/613 |
| 2009/0308538 A1 * | 12/2009 | Yonekura | H01L 21/67109 | 118/728 |
| 2010/0143097 A1 * | 6/2010 | Read | F01D 5/282 | 415/119 |
| 2011/0221076 A1 * | 9/2011 | Takayama | H01L 23/142 | 257/786 |
| 2011/0229837 A1 * | 9/2011 | Migita | H01L 21/6831 | 156/60 |
| 2012/0080799 A1 * | 4/2012 | Hohlfeld | H01L 23/3735 | 257/772 |
| 2012/0211764 A1 * | 8/2012 | Okamoto | H01L 24/83 | 257/772 |
| 2013/0134591 A1 * | 5/2013 | Sakamoto | H01L 23/3735 | 257/746 |
| 2014/0054757 A1 * | 2/2014 | Ikuta | H01L 23/495 | 438/123 |
| 2014/0111956 A1 * | 4/2014 | Taniguchi | C04B 37/026 | 228/249 |
| 2015/0298232 A1 * | 10/2015 | Herrmann | B23K 35/262 | 228/180.1 |
| 2015/0322800 A1 * | 11/2015 | Crosatti | B22F 5/04 | 416/95 |
| 2016/0181137 A1 * | 6/2016 | Lee | C22C 49/14 | 118/723 R |
| 2016/0196999 A1 * | 7/2016 | Yanoh | H01L 21/6831 | 361/234 |
| 2016/0358801 A1 * | 12/2016 | Minami | C04B 37/025 | |
| 2017/0133258 A1 * | 5/2017 | Miwa | H01L 21/6831 | |
| 2017/0210090 A1 * | 7/2017 | Kim | B32B 15/043 | |
| 2018/0108556 A1 * | 4/2018 | Takebayashi | C04B 37/006 | |
| 2018/0200817 A1 * | 7/2018 | Henderson | B23K 1/0018 | |
| 2018/0374679 A1 * | 12/2018 | Ito | H01J 37/32724 | |
| 2019/0143459 A1 * | 5/2019 | Bruck | B23K 35/0233 | 228/121 |
| 2019/0151974 A1 * | 5/2019 | Blank | B23K 20/24 | |
| 2020/0035535 A1 * | 1/2020 | Parkhe | H01L 21/67103 | |
| 2021/0268616 A1 * | 9/2021 | Sato | H01L 21/6833 | |
| 2023/0303457 A1 * | 9/2023 | Yoshimoto | C04B 37/026 | |
| 2023/0311451 A1 * | 10/2023 | Yoshimoto | B23K 1/0016 | |

FOREIGN PATENT DOCUMENTS

| | | | | |
|---|---|---|---|---|
| CN | 102068857 A | * | 5/2011 | |
| CN | 103785830 A | * | 5/2014 | |
| CN | 105817618 A | * | 8/2016 | B22F 3/002 |
| CN | 108907199 A | * | 11/2018 | B22F 5/00 |
| CN | 108926908 A | * | 12/2018 | B01D 39/10 |
| CN | 109755208 A | * | 5/2019 | |
| CN | 110202151 A | * | 9/2019 | B22F 3/11 |
| DE | 102016202229 A1 | * | 8/2017 | B23K 35/001 |
| EP | 1130643 A2 | * | 9/2001 | H01L 24/83 |

(56) References Cited

FOREIGN PATENT DOCUMENTS

| | | | | | |
|---|---|---|---|---|---|
| JP | 55093230 | A | * | 7/1980 | |
| JP | 60006286 | A | * | 1/1985 | |
| JP | S60-132742 | A | | 7/1985 | |
| JP | 60-186483 | A | | 9/1985 | |
| JP | 02175803 | A | * | 7/1990 | .......... H01M 8/0232 |
| JP | 09017849 | A | * | 1/1997 | |
| JP | 09045757 | A | * | 2/1997 | |
| JP | 10041377 | A | * | 2/1998 | |
| JP | 2594000 | Y2 | | 4/1999 | |
| JP | 2004174522 | A | * | 6/2004 | ............. H01L 24/27 |
| JP | 2004298962 | A | * | 10/2004 | ............. H01L 24/29 |
| JP | 2006344500 | A | * | 12/2006 | |
| JP | 2008200728 | A | * | 9/2008 | |
| JP | 2008311273 | A | * | 12/2008 | ............. H01L 24/83 |
| JP | 2009094385 | A | * | 4/2009 | ............. H01L 24/32 |
| JP | 2010-52015 | A | | 3/2010 | |
| JP | 2010-179313 | A | | 8/2010 | |
| JP | 2012-091975 | A | | 5/2012 | |
| JP | 2015135956 | A | * | 7/2015 | ............. H01L 24/32 |
| JP | 2020-053559 | A | | 4/2020 | |
| JP | 2020-068219 | A | | 4/2020 | |
| KR | 2013-0042777 | A | | 4/2013 | |
| KR | 20190020572 | A | * | 3/2019 | ............... B23Q 3/15 |
| TW | 201643990 | A | | 12/2016 | |
| WO | WO-2012004876 | A1 | * | 1/2012 | ............. H01L 24/06 |
| WO | 2016/142239 | A1 | | 9/2016 | |
| WO | WO-2018042890 | A1 | * | 3/2018 | ............. H01L 24/29 |

OTHER PUBLICATIONS

Machine Translation of JPH0917849A, Jan. 1997 (Year: 1997).*
Machine Translation of JP2008311273A, Dec. 2008 (Year: 2008).*
Machine Translation of CN101596595A, Dec. 2009 (Year: 2009).*
Machine Translation of CN105817618A, Aug. 2016 (Year: 2016).*
Korean Intellectual Property Office, Office Action (Request for the Submission of an Opinion) issued in corresponding Application No. 10-2022-7038299 mailed Sep. 20, 2024.
JIS Handbook 31, Japan Standards Association, Jun. 21, 2013, first edition, first printing, p. 240.
Japan Patent Office, Office Action (Notice of Reasons for Refusal) issued in corresponding Application No. JP 2022-531758, mailed Dec. 24, 2024.
Japan Patent Office, International Search Report issued in corresponding Application No. PCT/JP2021/022229, mailed Aug. 10, 2021.
Taiwan Patent Office, Office Action issued in corresponding Application No. 110121355 (no translation available).
Korean Intellectual Property Office, Office Action (Request for the Submission of an Opinion) issued in corresponding Application No. 10-2022-7038299 dated May 29, 2025.
China National Intellectual Property Administration, The First Office Action issued in corresponding Application No. 202180034078.3 dated Apr. 26, 2025.
China National Intellectual Property Administration, Office Action issued in corresponding Application No. 2021800340783 dated Nov. 14, 2025.

* cited by examiner

[Fig. 1]
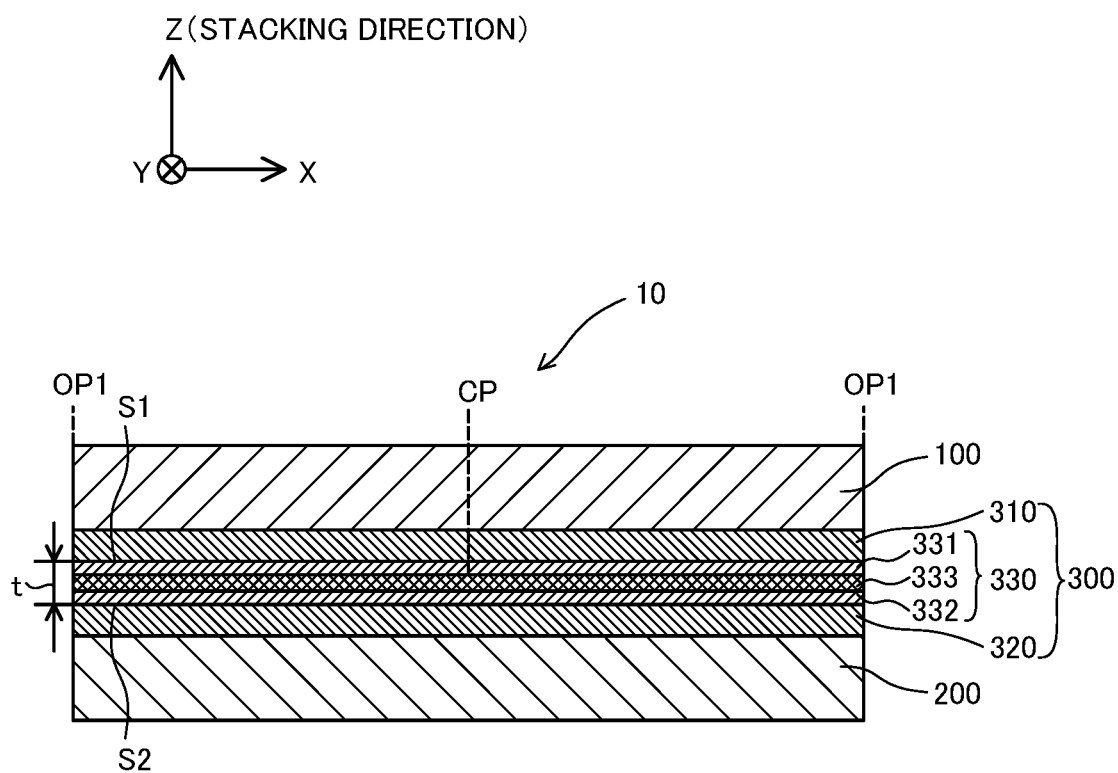

[Fig. 2]

| SAMPLE NO. | | 1 | 2 | 3 | 4 | 5 |
|---|---|---|---|---|---|---|
| METAL LAYER | | ABSENT | PRESENT | | | |
| VOID FRACTION (%) | | | 30 | 50 | 90 | 95 |
| FIRST MEMBER DEFORMATION AMOUNT ($\mu m$) | AFTER JOINING | × | 30 | 15 | 2 | × |
| | AFTER HEAT CYCLE TEST | | 18 × | 15 ○ | 2 ○ | |

[Fig. 3]

| JOINED BODY DIAMETER (mm) | METAL LAYER THICKNESS (mm) | | |
|---|---|---|---|
| | 0.5 | 1.0 | 3.0 |
| 100 | × | ○ | ○ |
| 350 | × | ○ | ○ |

[Fig. 4]

| FIBER DIAMETER ($\mu$m) | 10 | 30 | 50 |
|---|---|---|---|
| VOIDS AFTER JOINING | PRESENT | PRESENT | ABSENT |

[Fig. 5]
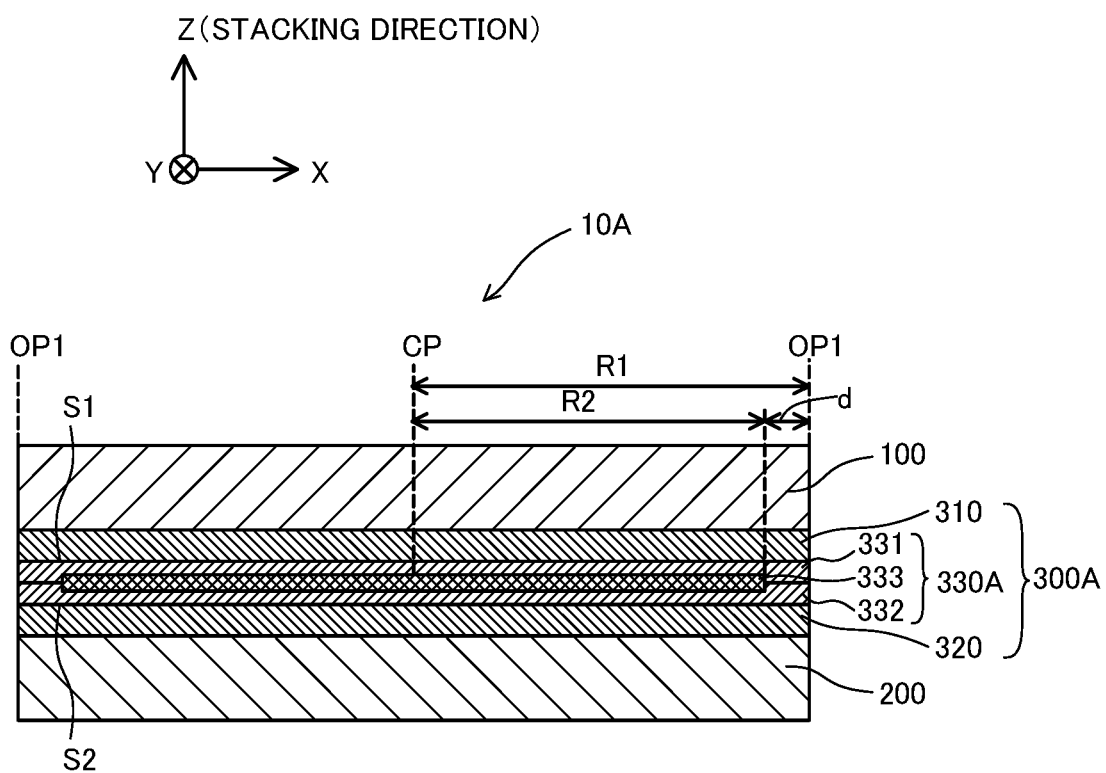

[Fig. 6]
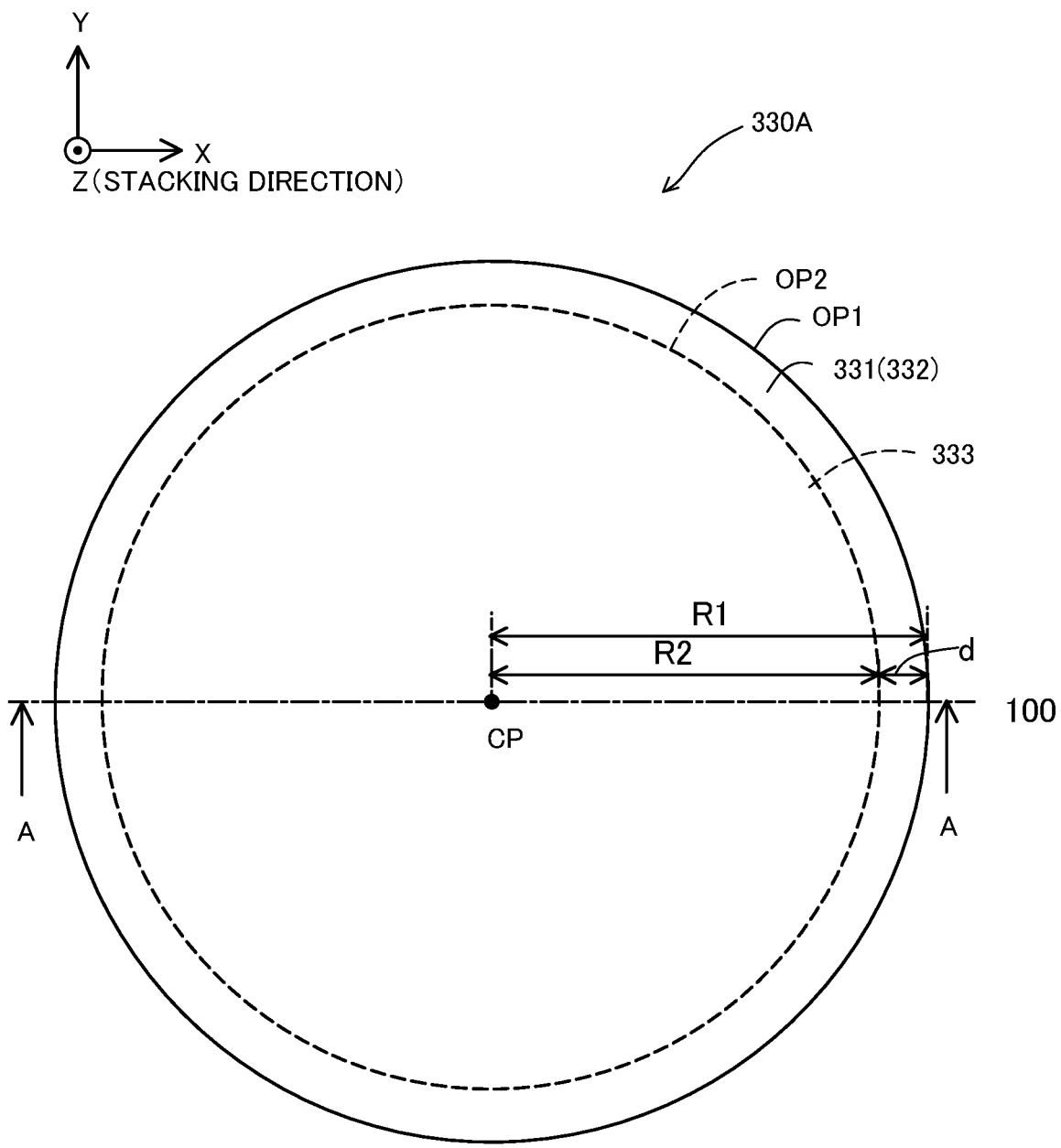

[Fig. 7]
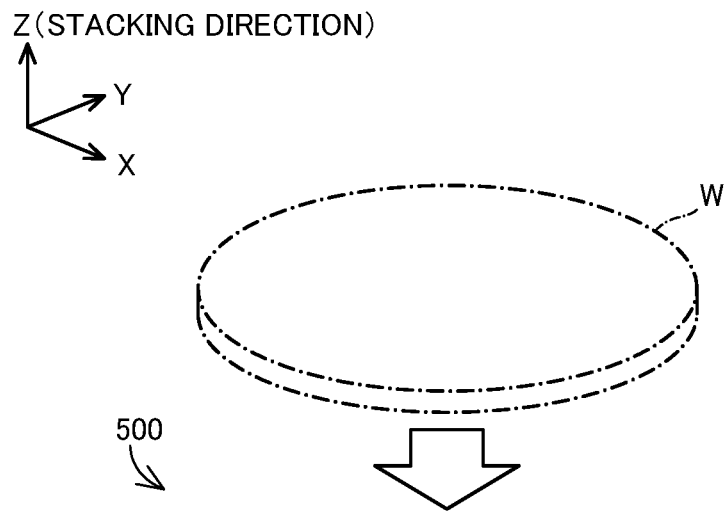
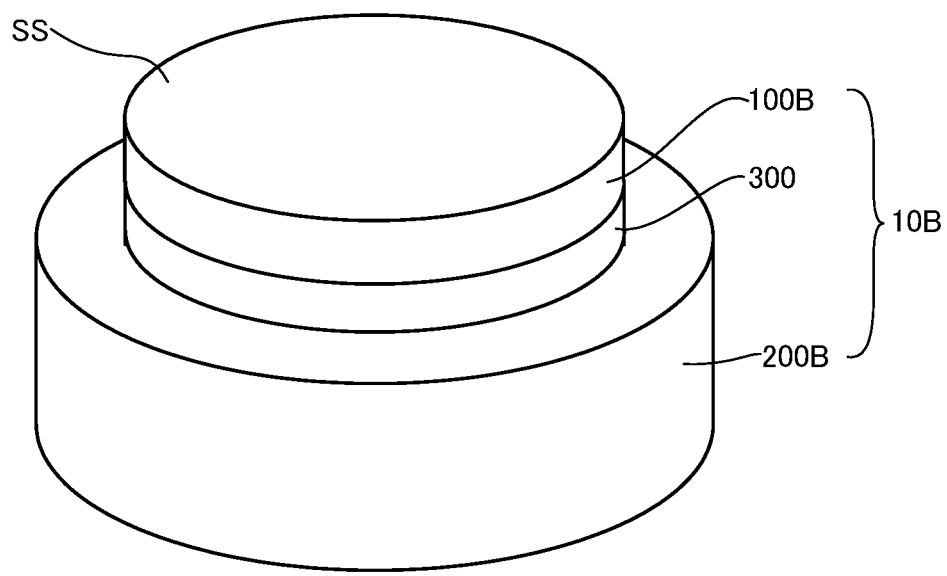

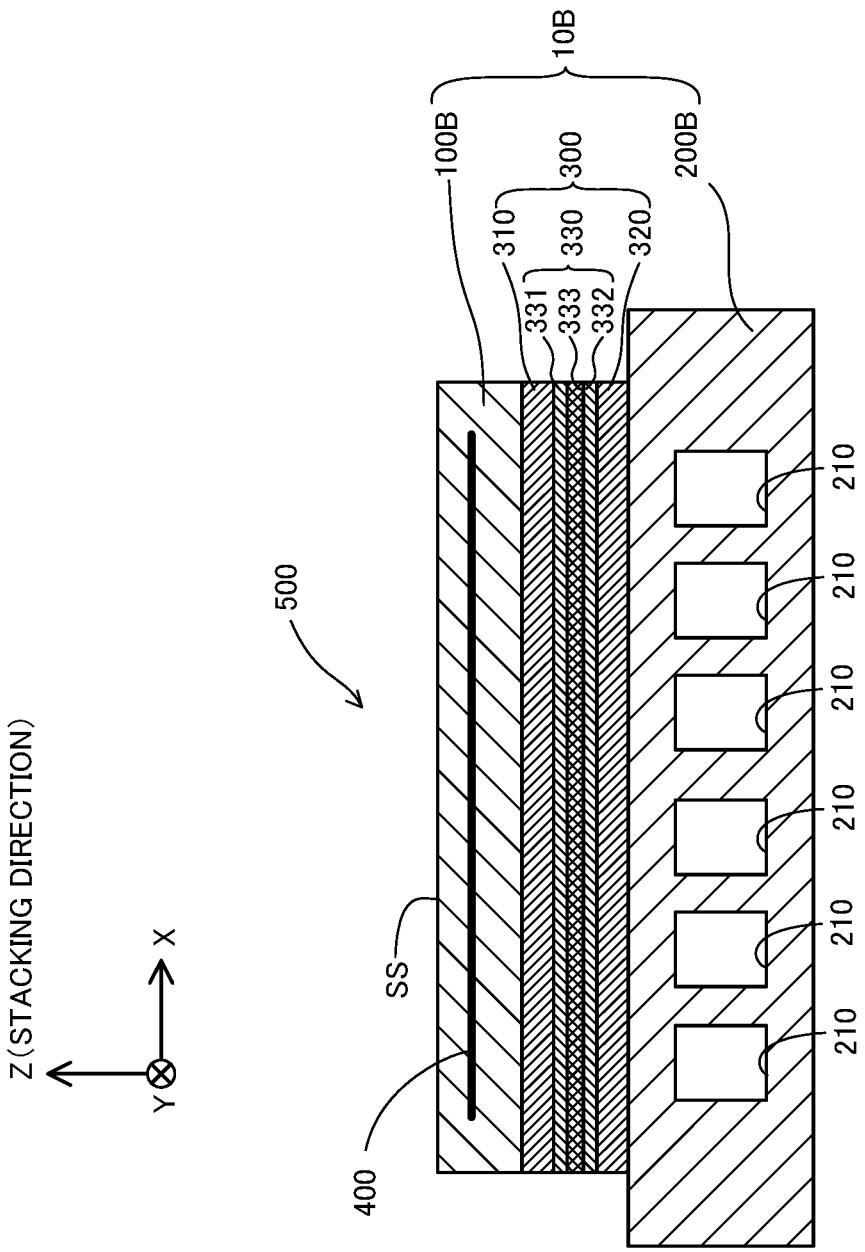
[Fig. 8]

JOINED BODY AND ELECTROSTATIC CHUCK

TECHNICAL FIELD

The present invention relates to a joined body including two members joined together.

BACKGROUND ART

For a joined body in which two members formed of a metal, a ceramic material, etc. are joined together by using a filler material such as brazing filler metal or a joining material such as adhesive, there have conventionally been proposed techniques for preventing distortion which would otherwise occur due to, for example, the difference in coefficient of thermal expansion between the two members (see, for example, Patent Documents 1 and 2).

Patent Document 1 discloses a technique for joining two members via a joining layer including solder and metal mesh so as to make the thickness of the joining layer uniform and sufficiently large, thereby preventing a decrease in thermal stress relaxing ability.

Patent Document 2 discloses a technique for joining a ceramic material and a metallic material by disposing a porous metallic material therebetween as an intermediate layer, so that thermal stress is relaxed as a result of deformation of the intermediate layer.

PRIOR ART DOCUMENTS

Patent Documents

Patent Document 1: Japanese Patent Application Laid-Open (kokai) No. 2010-179313
Patent Document 2: Japanese Patent Application Laid-Open (kokai) No. 2012-91975

SUMMARY OF THE INVENTION

Problem to be Solved by the Invention

In the technique described in Patent Document 1, a cell structure is fixed by a joining layer after joining. Therefore, the technique described in Patent Document 1 has a problem that its stress buffering effect becomes smaller when the joined body is used. In Patent Document 2, the degree of infiltration of a brazing filler metal into the porous metallic material is not mentioned, and, depending on the degree of infiltration of the brazing filler metal into the porous metallic material, there arises a possibility that joining fails to be performed sufficiently or that the stress buffering effect of the porous metallic material becomes smaller.

The present invention has been accomplished so as to solve the above-described problem, and an object of the present invention is to provide another technique for buffering stresses in a joined body in which two members are joined together by using a joining material.

Means for Solving the Problem

The present invention has been accomplished so as to solve at least part of the above-described problem and can be realized in the following aspects.

(1) According to one aspect of the present invention, a joined body is provided. This joined body comprises a plate-shaped first member, a flat plate-shaped second member, and a joining portion disposed between the first member and the second member and joining the first member and the second member together, wherein the joining portion includes a first joining layer formed of a first joining material and disposed on a side toward the first member, a second joining layer formed of a second joining material and disposed on a side toward the second member, and a flat plate-shaped metal layer disposed between the first joining layer and the second joining layer and having a plurality of holes communicating with one another. The metal layer includes a first-joining-material-impregnated layer which is disposed on a side toward the first joining layer and in which the plurality of holes are impregnated with the first joining material, a second-joining-material-impregnated layer which is disposed on a side toward the second joining layer and in which the plurality of holes are impregnated with the second joining material, and an unfilled hole layer which is disposed between the first-joining-material-impregnated layer and the second-joining-material-impregnated layer and in which the plurality of holes are void.

According to this configuration, since the metal layer of the joining portion has the unfilled hole layer, the metal layer can deform under a heating or cooling atmosphere during use of the joined body. Therefore, stresses generated as a result of deformation of the first member and the second member can be buffered by the metal layer, and distortion, warpage, separation, etc. of the joined body can be prevented. Also, as a result of the metal layer being impregnated with the joining materials, the first-joining-material-impregnated layer and the second-joining-material-impregnated layer are formed in the metal layer. Therefore, the first joining layer and the metal layer can be joined satisfactorily and the second joining layer and the metal layer can be joined satisfactorily. As a result, the first member and the second member can be joined together satisfactorily, whereby separation can be prevented.

(2) In the joined body of the above-described aspect, the unfilled hole layer of the metal layer may be formed to extend from a center of the metal layer to its circumference. This configuration enables buffering of stresses over the entire main face of the first member and over the entire main face of the second member, whereby a greater stress buffering effect can be obtained.

(3) In the joined body of the above-described aspect, the metal layer may be formed of felt of metal fibers. In the metal fiber felt, fibers can move easily. Therefore, when this configuration is employed, stresses can be relaxed more properly.

(4) In the joined body of the above-described aspect, the metal fibers may have a diameter of 1 micrometer or greater and 30 micrometers or less. When the metal fibers have such a diameter, the unfilled hole layer of the metal layer can be formed properly.

(5) In the joined body of the above-described aspect, the metal layer may have a void fraction of 50% or greater and 90% or less.

When the metal layer has such a void fraction, the stress relaxing effect by the unfilled hole layer of the metal layer can be obtained sufficiently.

(6) In the joined body of the above-described aspect, a relation of $t \geq 0.07 \log(S) - 0.1$ may be satisfied, where S is an average area (mm$^2$) of an area of junction between the metal layer and the first joining layer and an area of junction between the metal layer and the second joining layer, and t is a thickness (mm) of the metal layer. When the above-described relation is satisfied, a greater stress relaxing effect can be obtained.

(7) In the joined body of the above-described aspect, each of the first joining material and the second joining material may be formed of an inorganic material or a metal. Since inorganic and metal joining materials are higher in heat proof temperature than organic joining materials such as resin, the joined body can be used, for example, under a high temperature environment of 300 degrees Celsius or higher.

(8) According to another aspect of the present invention, an electrostatic chuck is provided. This electrostatic chuck comprises a joined body. A main face of the first member is a placement surface on which an object to be held is placed. In this configuration, stresses are relaxed by the unfilled hole layer of the metal layer, and deformation of the first member during use of the electrostatic chuck can be prevented. Therefore, deformation of the placement surface, on which the object to be held is placed, can be prevented, whereby the holding performance of the electrostatic chuck can be enhanced.

Notably, the present invention can be realized in various modes. For example, the present invention may be realized as a holding apparatus having a joined body, a semiconductor component having a joined body, a wavelength conversion component having a joined body, a method for producing a joined body, and a method for producing an electrostatic chuck having a joined body.

BRIEF DESCRIPTION OF THE DRAWINGS

FIG. 1 Explanatory view schematically showing the structure of a joined body of a first embodiment as viewed along an XZ cross section thereof.

FIG. 2 Table showing the relation between the void fraction of a metal layer and the amount of deformation of a first member.

FIG. 3 Table showing the relation between the thickness of the metal layer and stress buffering effect.

FIG. 4 Table showing the relation between the metal fiber diameter of the metal layer and stress buffering effect.

FIG. 5 Explanatory view schematically showing the structure of a joined body in a second embodiment as viewed along an XZ cross section thereof.

FIG. 6 Explanatory view schematically showing the planar structure of a metal layer in the second embodiment.

FIG. 7 Perspective view schematically showing the external structure of an electrostatic chuck in a third embodiment.

FIG. 8 Explanatory view schematically showing the structure of the electrostatic chuck as viewed along an XZ cross section thereof.

MODES FOR CARRYING OUT THE INVENTION

First Embodiment

FIG. 1 is an explanatory view schematically showing the structure of a joined body 10 of a first embodiment as viewed along an XZ cross section thereof. In FIG. 1, the positive direction along the Y axis is a direction toward the reverse side of the sheet. In FIG. 1, the X, Y, and Z axes which are orthogonal to one another are shown for specifying directions. In the present specification, for the sake of convenience, the positive direction along the Z axis will be referred to as the upper direction, and the negative direction along the Z axis will be referred to as the lower direction. However, in actuality, the joined body 10 may be used in an orientation different from such an orientation.

The joined body 10 includes a flat plate-shaped first member 100, a flat plate-shaped second member 200, and a joining portion 300 disposed between the first member 100 and the second member 200 and joining together the first member 100 and the second member 200. The joined body 10 is formed into an approximately circular columnar shape.

The first member 100 is a plate-shaped member having approximately circular flat main faces and is formed of a ceramic material. The diameter of the first member 100 is, for example, about 5 mm to 350 mm, and the thickness of the first member 100 is, for example, about 0.5 mm to 6 mm. Examples of various types of ceramic materials which can be used include alumina ($Al_2O_3$), aluminum nitride (AlN), zirconia ($Zro_2$), silicon nitride ($Si_3N_4$), and silicon carbide (SiC). Furthermore, metal plating may be performed on the first member 100. Also, the dimensions of the first member 100 may be appropriately set according to intended use, etc.

The second member 200 is, for example, a plate-shaped member having approximately circular flat main faces whose diameter is equal to that of the first member 100. The second member 200 is formed of a metal. In the present embodiment, the thickness of the second member 200 is, for example, about 1 mm to 30 mm. Notably, the second member 200 may be an approximately circular plate having a diameter different from that of the first member 100. Examples of types of metals which can be used include stainless steel, copper, aluminum, and aluminum alloy. Also, the dimensions of the second member 200 may be appropriately set according to intended use, etc.

The joining portion 300 joins together the first member 100 and the second member 200. The joining portion 300 includes a first joining layer 310 formed of a first joining material and disposed on a side toward the first member 100, a second joining layer 320 formed of a second joining material and disposed on a side toward the second member 200, and a metal layer 330 disposed between the first joining layer 310 and the second joining layer 320.

Examples of materials which can be used as the first joining material and the second joining material include a filler material such as a brazing filler metal (e.g., titanium (Ti)-containing brazing filler metal and a silver-based brazing filler metal) and solder; adhesives such as silicone resin, acrylic resin, and epoxy resin; and inorganic adhesives such as glass paste. In the case where an inorganic material or a metallic material is used as the first joining material and the second joining material, since the inorganic material and the metallic material are higher in heat proof temperature than organic adhesives such as resin, the joined body 10 can be used even under a high temperature environment of, for example, 300 degrees Celsius or higher. Therefore, use of an inorganic material or a metallic material as the first joining material and the second joining material is preferred. The first joining material and the second joining material may differ from each other or may be the same. In the present embodiment, each of the first joining layer 310 and the second joining layer 320 has a thickness of, for example, about 0.05 mm. The thickness of the first joining layer 310 and the second joining layer 320 can be set appropriately. In the following description, when the first joining material and the second joining material are not distinguished from each other, the first joining material and the second joining material may be referred to simply as the "joining material," and, when the first joining layer and the second joining layer are not distinguished from each other, the first joining layer and the second joining layer may be referred to simply as the "joining layer."

The metal layer 330 is a plate-shaped member having approximately circular flat main faces whose diameter is equal to those of the first member 100 and the second member 200. A plurality of holes communicating with one another are formed in the metal layer 330. The metal layer 330 of the present embodiment is metal fiber felt. Examples of metals which can be used for metal fibers include nickel, aluminum, copper, brass, stainless steel, and alloys of these metals. Although no particular limitation is imposed on the thickness t (FIG. 1) of the metal layer 330, the thickness t is, for example, about 0.2 mm to 3 mm. The thickness of the metal layer 330 can be set appropriately, for example, on the basis of the relation between the area of junction between the metal layer 330 and the first joining layer 310 and the area of junction between the metal layer 330 and the second joining layer 320. Although no particular limitation is imposed on the void fraction of the metal layer 330, the void fraction of the metal layer 330 is, for example, 50% or greater and 90% or less. Although no particular limitation is imposed on the diameter of metal fibers, the diameter of metal fibers is, for example, 1 micrometer or greater and 30 micrometers or less.

The metal layer 330 includes a first-joining-material-impregnated layer 331 disposed on the side toward the first joining layer 310 and having a plurality of holes impregnated with the first joining material, a second-joining-material-impregnated layer 332 disposed on the side toward the second joining layer 320 and having a plurality of holes impregnated with the second joining material, and an unfilled hole layer 333 disposed between the first-joining-material-impregnated layer 331 and the second-joining-material-impregnated layer 332 and having a plurality of unfilled holes. The joined body 10 of the present embodiment is formed by joining together the first member 100 and the second member 200, using the first joining material and the second joining material, with the metal layer 330 intervening between the first member 100 and the second member 200. When the joined body 10 is manufactured, a portion of the first joining material infiltrates into a portion of the metal layer 330, whereby the first-joining-material-impregnated layer 331 is formed, and a portion of the second joining material infiltrates into a portion of the metal layer 330, whereby the second-joining-material-impregnated layer 332 is formed. At that time, none of the first joining material and the second joining material infiltrate into a layer-shaped portion of the metal layer 330, and that portion serves as the unfilled hole layer 333. As shown in the drawings, in the joined body 10 of the present embodiment, the unfilled hole layer 333 is formed to extend from the center CP of the metal layer 330 to its circumference OP1.

As described above, in the joined body 10 of the present embodiment, the first member 100 formed of a ceramic material and the second member 200 formed of a metal may differ in coefficient of thermal expansion from each other. Therefore, the amount of deformation of the first member 100 caused by a change in use temperature of the joined body 10 may differ from the amount of deformation of the second member 200 caused by the change in use temperature of the joined body 10. In the joined body 10 of the present embodiment, the metal layer 330 of the joining portion 300 includes the unfilled hole layer 333, and the unfilled hole layer 333 can deform relatively freely. Therefore, even in the case where the first member 100 and the second member 200 deform at different deformation rates due to a change in the use temperature of the joined body 10, stresses generated as a result of deformation of the first member 100 and the second member 200 can be relaxed through deformation of the unfilled hole layer 333 of the metal layer 330. As a result, separation or warpage of the first member 100 and the second member 200 can be prevented.

In the joined body 10 of the present embodiment, since the unfilled hole layer 333 is formed to extend from the center CP to the circumference OP1 of the metal layer 330, the stress buffering effect of the unfilled hole layer 333 can be obtained over the entire main faces of the first member 100 and the second member 200. Therefore, separation and warpage can be prevented more reliably.

Also, in the joined body 10 of the present embodiment, the metal layer 330 is impregnated with the joining materials, whereby the first-joining-material-impregnated layer 331 and the second-joining-material-impregnated layer 332 are formed in the metal layer 330. Therefore, the first joining layer 310 and the metal layer 330 can be joined together satisfactorily and the second joining layer 320 and the metal layer 330 can be joined together satisfactorily. As a result, the first member 100 and the second member 200 can be joined together satisfactorily, and separation of the first member 100 and the second member 200 can be prevented.

Next, the results of studies performed on the void fraction, thickness, metal fiber diameter of the metal layer 330 will be described.

FIG. 2 is a table showing the relation between the void fraction of the metal layer 330 and the amount of deformation of the first member 100. Samples of the joined body 10 shown in FIG. 2 have the shape of an approximately circular column having a diameter of 36 mm. The first member 100 is formed of alumina ($Al_2O_3$) and has a thickness of 3.6 mm. The second member 200 is formed of stainless steel and has a thickness of 30 mm. The metal layer 330 is felt of metal fibers, the type of metal is stainless steel, and the diameter of the fiber material is 10 micrometers. Each of the first joining material and the second joining material is a sheet-shaped, titanium (Ti)-containing brazing filler metal having a thickness of 0.05 mm.

The samples of the joined body 10 shown in FIG. 2 were prepared by changing the void fraction of the metal layer 330 among 30%, 50%, 90%, and 95% as shown in FIG. 2. After the first and second members of each sample were joined together, the amount of deformation of the first member 100 of the sample was investigated. Similarly, after a heat cycle test was performed on each sample, the amount of deformation of the first member 100 of the sample was investigated. The joining temperature is 930 degrees Celsius. In the heat cycle test, a heat cycle from room temperature to 350 degrees Celsius was repeated 50 times. The amount of deformation of the first member 100 is the difference in height between the center of the surface (main face) of the first member 100 and an end portion of the surface. The void fraction was calculated from the weight A (g/cm$^2$) and thickness B (cm) of the metal fibers as follows by using the density C (g/cm$^3$) of the base material. The weight refers to the weight of fibers per unit area.

Void fraction=1−(A/B)/C

Samples 2 to 5 have the same structure although their metal layers 330 have different void fractions. Although Sample 1 does not include the metal layer 330, the structure of the remaining portion of Sample 1 is identical with those of Samples 2 to 5.

In Sample 1, the joining portion 300 does not include the metal layer 330. In this structure, when the first member 100 and the second member 200 were joined together, cracking occurred in the first member 100 and the first member 100 and the second member 200 were not able to be joined together.

In Sample 2, the void fraction of the metal layer 330 is 30%. In the case of Sample 2, the amount of deformation of the first member 100 caused by joining was 30 micrometers; i.e., the first member 100 deformed relatively greatly. The amount of deformation after the thermal cycle test was 18 micrometers, which indicates a decrease in the amount of deformation. However, tearing of the metal fibers occurred in a portion of the unfilled hole layer 333. It is considered that tearing of the metal fibers occurred because of the following reason. Since the void fraction of the metal layer 330 was 30%, the number of voids was relatively small, and the junction area and the contact areas among the metal fibers increased. Thus, the stress buffering effect became smaller, and a large stress was generated at a contact portion between the metal fibers. As a result, tearing of the metal fibers occurred.

In Sample 3, the void fraction of the metal layer 330 is 50%. In Sample 4, the void fraction of the metal layer 330 is 90%. In Samples 3 and 4, the deformation of the first member 100 after the joining process is smaller as compared with Sample 1. Also, the amount of deformation of the first member 100 after the heat cycle test is the same as the amount of deformation of the first member 100 after the joining process. Namely, the stress buffering effect was obtained by the metal layer.

In Sample 5, the void fraction of the metal layer 330 is 95%. In this structure, when the first member 100 and the second member 200 were joined together, almost all of the joining material infiltrated into the metal layer 330, and the first member 100 and the second member 200 were not able to be joined together.

As shown in FIG. 2, when the void fraction of the metal layer 330 is 50% or greater and 90% or less, a sufficient stress buffering effect is attained, and deterioration (e.g., deformation, separation, and tearing) of the joined body 10 can be prevented.

FIG. 3 is a table showing the relation between the thickness of the metal layer and the stress buffering effect. Samples of the joined body 10 shown in FIG. 3 are of two types of approximately circular columnar joined bodies whose diameters (described as "joined body diameter" in FIG. 3) are 100 mm and 350 mm, respectively. The first member 100 is formed of alumina ($Al_2O_3$) and has a thickness of 6 mm. The second member 200 is formed of stainless steel and has a thickness of 23 mm. The metal layer 330 is felt of metal fibers, the type of metal is stainless steel, and the diameter of the fiber material is 10 micrometers. The void fraction of the metal layer 330 is 80%. Each of the first joining material and the second joining material is a sheet-shaped, titanium (Ti)-containing brazing filler metal having a thickness of 0.05 mm.

FIG. 3 shows samples produced by joining together the first member 100 and the second member 200 having a diameter of 100 mm, by using the joining materials, with the metal layer 330 having a thickness of 0.5 mm, 1.0 mm, or 3.0 mm interposed between the first member 100 and the second member 200, and samples produced by joining together the first member 100 and the second member 200 having a diameter of 350 mm, by using the joining materials, with the metal layer 330 having a thickness of 0.5 mm, 1.0 mm, or 3.0 mm interposed between the first member 100 and the second member 200. The joining temperature is 930 degrees Celsius. In these samples, the first member 100, the second member 200, the metal layer 330, and the joining materials have the same diameter.

As shown in FIG. 3, in both the case where the joined body diameter was 100 mm and the case where the joined body diameter was 350 mm, when the thickness of the metal layer 330 was 0.5 mm, tearing occurred in a portion of the metal fibers of the metal layer. In the case where the thickness of the metal layer 330 was 1.0 mm or 3.0 mm, the joined state was good. Namely, in the case where the thickness of the metal layer 330 was 1.0 mm or 3.0 mm, it can be said that the stress buffering effect by the metal layer was obtained.

The relation between the thickness of the metal layer 330 and the stress buffering effect may change with the area of junction. A greater stress buffering effect can be obtained when a relation of $t \geq 0.07 \log(S) - 0.1$ is satisfied, where S is the average area ($mm^2$) of the area of junction S1 (FIG. 1) between the metal layer 330 and the first joining layer 310 and the area of junction S2 (FIG. 1) between the metal layer 330 and the second joining layer 320, and t is the thickness (mm) of the metal layer 330.

FIG. 4 is a table showing the relation between the metal fiber diameter of the metal layer and the stress buffering effect. In samples of the joined body 10 shown in FIG. 4, the first member 100 is an approximately circular plate which is formed of silicon (Si), is plated with a metal, and has a diameter of 5 mm and a thickness of 0.5 mm. The second member 200 is an approximately circular plate which is formed of copper and has a diameter of 20 mm and a thickness of 1 mm. The metal layer is an approximately circular felt which is formed of a metal (copper) fiber material, whose void fraction is 80%, and which has a diameter of 7 mm and a thickness of 0.2 mm. These members were joined together at a joining temperature of 280 degrees Celsius by using a sheet-shaped, 0.05 mm-thick joining material formed of a gold tin (AuSn) solder having a thickness of 0.05 mm. In these samples, the first member 100, the first joining layer 310, and the second joining layer 320 have the same diameter, the diameter of the metal layer 330 is greater than the diameter of the first member 100, the first joining layer 310, and the second joining layer 320, and the diameter of the second member 200 is greater than the diameter of the metal layer 330.

In the samples shown in FIG. 4, the first member 100 and the second member 200 were joined together by using respective felts composed of metal fibers having different diameters (10 micrometers, 30 micrometers, and 50 micrometers) as the metal layer 330. After the joining process, the samples were observed by an x-ray transmission method and their cross sections were observed so as to determine whether or not voids were present.

As shown in FIG. 4, in the samples in which the diameter of the metal fibers was 10 micrometers or 30 micrometers, voids were found after the joining process. However, in the sample in which the diameter of the metal fibers was 50 micrometers, no void was found.

Conceivably, the reason is as follows. In the case where the diameter of the metal fibers is 50 micrometers, even when the void fraction is the same as that in the case where the diameter of the metal fibers is 10 micrometers or 30 micrometers, the size of each void is larger, and the joining materials easily infiltrate into the felt. In the case where felt of metal fibers is used as the metal layer 330, when the diameter of the metal fibers is 30 micrometers or less, an unfilled hole layer can be formed. Therefore, the stress buffering effect can be obtained properly.

Second Embodiment

FIG. 5 is an explanatory view schematically showing the structure of a joined body 10A in a second embodiment as viewed along an XZ cross section thereof. In FIG. 5, the positive direction along the Y axis is a direction toward the reverse side of the sheet. FIG. 6 is an explanatory view schematically showing the planar structure of a metal layer 330A in the second embodiment. In FIG. 6, the metal layer 330A is viewed from the upper side (the positive direction in the Z axis). FIG. 5 can be said as a cross sectional view taken along line A-A in FIG. 6. In FIGS. 5 and 6, the center CP and circumference OP1 of the metal layer 330A are shown. In FIG. 6, the circumference OP2 of the unfilled hole layer 333 of the metal layer 330A is indicated by a broken line.

In the joined body 10A of the present embodiment, the unfilled hole layer 333 of the metal layer 330 is not formed to extend from the center of the metal layer 330 to the circumference thereof. The circumference OP2 of the unfilled hole layer 333 is shifted inward from the circumference OP1 of the metal layer 330A by a distance d. Namely, a portion of the metal layer 330A, which portion extends inward from the circumference OP1 over the distance d, is impregnated with the first joining material and the second joining material. The metal layer 330A is a circular plate having a radius R1, and the unfilled hole layer 333 is formed into the shape of a circular plate having a radius R2 (R2<R1).

Even in the joined body 10A of the present embodiment, the metal layer 330A has the unfilled hole layer 333. Therefore, stresses generated as a result of deformation of the first member 100 and the second member 200 can be buffered, whereby distortion, warpage, separation, etc. of the joined body 10A can be prevented.

Third Embodiment

FIG. 7 is a perspective view schematically showing the external structure of an electrostatic chuck 500 in a third embodiment. FIG. 8 is an explanatory view schematically showing the structure of the electrostatic chuck 500 as viewed along an XZ cross section thereof. In FIGS. 7 and 8, the X, Y, and Z axes which are orthogonal to one another are shown for specifying directions. In FIG. 8, the positive direction along the Y axis is a direction toward the reverse side of the sheet. In the present specification, for the sake of convenience, the positive direction along the Z axis will be referred to as the upper direction, and the negative direction along the Z axis will be referred to as the lower direction. However, in actuality, the electrostatic chuck 500 may be disposed in an orientation different from such an orientation.

The electrostatic chuck 500 is a holding apparatus for holding an object (for example, a wafer W) by attracting the object by electrostatic attraction force and is used for fixing the wafer W, for example, within a vacuum chamber of a semiconductor manufacturing apparatus. The electrostatic chuck 500 includes a joined body 10B. The joined body 10B includes a first member 100B and a second member 200B which are juxtaposed in the vertical direction (the Z-axis direction). The joined body 10B further includes a joining portion 300 for joining the first member 100B and the second member 200B together.

The first member 100B is a plate-shaped member having a placement surface SS having an approximately circular planar shape and is formed of a ceramic material (for example, alumina, aluminum nitride, or the like). Namely, a main face of the first member 100B is the placement surface SS on which an object to be held is placed. The diameter of the first member 100B is, for example, about 50 mm to 500 mm (generally, about 200 mm to 350 mm), and the thickness of the first member 100B is, for example, about 1 mm to 10 mm.

An attraction electrode 400 (FIG. 8) formed of an electrically conductive material (for example, tungsten, molybdenum, or the like) is disposed in the first member 100B. The shape of the attraction electrode 400 as viewed in the Z-axis direction is, for example, approximately circular. When a voltage is applied to the attraction electrode 400 from a power supply (not shown), an electrostatic attraction force is generated, and the wafer W is attracted and fixed to the placement surface SS of the first member 100B by the electrostatic attraction force.

The second member 200B is a plate-shaped member having an approximately circular planar shape and having a diameter greater than that of the first member 100B. The second member 200B is formed of, for example, a metal such as aluminum or an aluminum alloy. The diameter of the second member 200B is, for example, about 220 mm to 550 mm (generally, 220 mm to 350 mm), and the thickness of the second member 200B is, for example, about 20 mm to 40 mm.

A coolant passage 210 (FIG. 8) is formed in the second member 200B. When the wafer W held on the first member 100B of the electrostatic chuck 500 is processed by using plasma, heat is inputted into the wafer W from the plasma, and the temperature of the wafer W increases. When a coolant (for example, fluorine-based inert liquid, water, or the like) is supplied to the coolant passage 210 formed in the second member 200B, the second member 200B is cooled, and the first member 100B is cooled as a result of thermal transmission between the second member 200B and the first member 100B through the joining portion 300, whereby the wafer W held on the placement surface SS of the first member 100B is cooled. As a result, the temperature of the wafer W is controlled.

The joining portion 300 is a plate-shaped member having an approximately circular planar shape and having a diameter equal to that of the first member 100B, and its structure is the same as the joining portion in the first embodiment.

In the electrostatic chuck 500 of the present embodiment, the metal layer 330 of the joining portion 300 has the unfilled hole layer 333. Therefore, stresses generated as a result of deformation of the first member 100B and the second member 200B can be buffered, whereby separation and warpage of the first member 100B and the second member 200B can be prevented. Accordingly, a decrease in the holding performance of the electrostatic chuck 500 can be prevented. Also, deterioration of the electrostatic chuck 500 can be prevented.

Modifications of the Present Embodiments

The present invention is not limited to the above-described embodiments and can be practiced in various forms without departing from the gist of the invention, and, for example, the following modifications are possible.

In the above-described embodiments, there is shown an example in which the first member is formed of a ceramic material and the second member is formed of a metal.

However, the present invention is not limited to the example. For example, both the first member and the second member may be ceramic members, or both the first member and the second member may be metal members. Further, the first member and the second member may be formed of a material other than ceramic materials and metals. For example, the first member and the second member may be formed of glass, glass epoxy, resin (e.g., thermoplastic resin, thermosetting resin, etc.), paper phenol, paper epoxy, glass composite, or a metal member with any of these insulating members formed on the surface.

The coefficient of thermal expansion of the material of the first member and the coefficient of thermal expansion of the material of the second member may be the same or differ from each other. Even in the case where the coefficients of thermal expansion of the two materials are the same, when the temperature of the first member and the temperature of the second member differ from each other, the first member and the second member deform in different amounts. Therefore, in the case where the first member and the second member are joined together by the joining portion 300 of any one of the above-described embodiments, stresses generated as a result of deformation of the first member and the second member can be relaxed.

In the joined body, another layer such as a metal layer may be additionally disposed between the first member and the joining portion and/or between the second member and the joining portion. The additional layer may be, for example, a layer formed as a result of vaporization of titanium (Ti) in the brazing filler metal which forms the joining portion, or a metallization layer formed beforehand.

In the above-described embodiments, felt of metal fibers is shown as an example of the metal layer. However, this is not a limitation, and various types of metal layers may be used. For example, a metal fiber joined body (e.g., mesh or woven cloth of metal fibers) manufactured by weaving metal fibers may be used. Also, a metal fiber joined body (e.g., web or unwoven cloth) manufactured by entangling a large number of metal fibers, without weaving the metal fibers, or bonding a large number of metal fibers by using heat or adhesive may be used. Also, metal foam may be used. The term "foam" refers to a material having a large number of pores therein.

The area of junction between the metal layer 330 and the first joining layer 310 and the area of junction between the metal layer 330 and the second joining layer 320 may be the same or differ from each other.

In one of the above-described embodiments, an electrostatic chuck is shown as an example holding apparatus. However, the holding apparatus is not limited to the electrostatic chuck. For example, the holding apparatus may be configured as a placement table, a susceptor, or a heater apparatus for a vacuum apparatus such as CVD, PVD, and PLD (Pulsed Laser Deposition).

In the above-described embodiments, columnar joined bodies each having an approximately circular flat surface are exemplified. However, the planar shape is not limited to those employed in the above-described embodiments. For example, the planar shape may be rectangular or polygonal.

Although the present invention has been described on the basis of embodiments and modifications, the above-described embodiments of the aspects are provided so as to facilitate the understanding of the present invention and do not limit the present invention. The present invention can be changed or improved without departing from the purpose of the invention and the claims, and encompasses equivalents thereof. Also, the technical feature(s) may be eliminated as appropriate unless the present specification mentions that the technical feature(s) is mandatory.

DESCRIPTION OF SYMBOLS 10, 10A, 10B: joined body
100, 100B: first member
200, 200B: second member
210: coolant passage
300: joining portion
310: first joining layer
320: second joining layer
330, 330A: metal layer
331: first-joining-material-impregnated layer
332: second-joining-material-impregnated layer
333: unfilled hole layer
400: attraction electrode
500: electrostatic chuck
CP: center
OP1, OP2: circumference
R1, R2: radius
SS: placement surface
S1, S2: area of junction
W: wafer
d: distance

What is claimed is:

1. A joined body comprising:
a flat plate-shaped first member;
a flat plate-shaped second member; and
a joining portion disposed between the first member and the second member and joining the first member and the second member together,
wherein the joining portion includes a first joining layer formed of a first joining material and disposed on a side toward the first member, a second joining layer formed of a second joining material and disposed on a side toward the second member, and a flat plate-shaped metal layer disposed between the first joining layer and the second joining layer and having a plurality of holes communicating with one another,
the metal layer including a first-joining-material-impregnated layer which is disposed on a side toward the first joining layer and in which the plurality of holes are impregnated with the first joining material, a second-joining-material-impregnated layer which is disposed on a side toward the second joining layer and in which the plurality of holes are impregnated with the second joining material, and an unfilled hole layer which is disposed between the first-joining-material-impregnated layer and the second-joining-material-impregnated layer and in which the plurality of holes are void;
wherein the metal layer is formed of felt of metal fibers;
wherein a relation of $t \geq 0.07 \log(S) - 0.1$ is satisfied, where S is an average area (mm$^2$) of an area of junction between the metal layer and the first joining layer and an area of junction between the metal layer and the second joining layer, and t is a thickness (mm) of the metal layer;
wherein $1.0 \leq t \leq 3.0$; and
wherein the metal layer has a void fraction of 50% or greater and 90% or less.

2. The joined body according to claim 1, wherein the unfilled hole layer of the metal layer is formed to extend from a center of the metal layer to its circumference.

3. The joined body according to claim 1, wherein the metal fibers have a diameter of 1 micrometer or greater and 30 micrometers or less.

4. The joined body according to claim 1, wherein each of the first joining material and the second joining material is formed of an inorganic material or a metal.

5. An electrostatic chuck comprising the joined body according to claim 1, wherein a main face of the first member is a placement surface on which an object to be held is placed.

6. The joined body according to claim 2, wherein each of the first joining material and the second joining material is formed of an inorganic material or a metal.

7. An electrostatic chuck comprising the joined body according to claim 2, wherein a main face of the first member is a placement surface on which an object to be held is placed.

8. The joined body according to claim 3, wherein each of the first joining material and the second joining material is formed of an inorganic material or a metal.

\* \* \* \* \*